(12) United States Patent
Fisher et al.

(10) Patent No.: US 7,143,222 B2
(45) Date of Patent: Nov. 28, 2006

(54) ADAPTIVE MESSAGE DELIVERY SYSTEM

(75) Inventors: James A. Fisher, Tucson, AZ (US);
Gregory T. Kishi, Oro Valley, AZ (US); Harish C. Mathur, Tucson, AZ (US); John T. Olson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 10/946,994

(22) Filed: Sep. 21, 2004

(65) Prior Publication Data

US 2006/0064527 A1    Mar. 23, 2006

(51) Int. Cl.
G06F 12/00 (2006.01)
G06F 11/00 (2006.01)
G01R 31/28 (2006.01)

(52) U.S. Cl. ............ 710/200; 714/800; 714/724; 714/723; 702/186; 718/100; 718/104

(58) Field of Classification Search ............ 710/6, 710/200, 263; 714/11, 47
See application file for complete search history.

(56) References Cited

U.S. PATENT DOCUMENTS

| | | | |
|---|---|---|---|
| 3,988,714 A * | 10/1976 | Bardotti | 714/800 |
| 4,320,258 A | 3/1982 | McDonald | |
| 4,780,809 A | 10/1988 | Woffinden et al. | |
| 5,119,377 A | 6/1992 | Cobb et al. | |
| 5,631,847 A | 5/1997 | Kikinis | |
| 5,809,491 A | 9/1998 | Kayalioglu et al. | |
| 5,892,898 A | 4/1999 | Fujii et al. | |
| 6,148,332 A | 11/2000 | Brewer et al. | |
| 6,212,261 B1 | 4/2001 | Meubus et al. | |
| 6,345,257 B1 | 2/2002 | Jarrett | |
| 6,516,055 B1 | 2/2003 | Bedeski et al. | |
| 6,643,613 B1 * | 11/2003 | McGee et al. | 702/186 |
| 6,654,375 B1 | 11/2003 | Vedder | |
| 6,721,812 B1 * | 4/2004 | Scott et al. | 710/5 |
| 6,912,482 B1 * | 6/2005 | Kaiser | 702/186 |
| 6,922,801 B1 * | 7/2005 | Archibald et al. | 714/723 |
| 7,028,298 B1 * | 4/2006 | Foote | 718/104 |
| 7,046,628 B1 * | 5/2006 | Luhmann et al. | 370/230 |
| 2004/0244001 A1 * | 12/2004 | Haller et al. | 718/100 |
| 2005/0160335 A1 * | 7/2005 | Peterson | 714/724 |
| 2006/0031461 A1 * | 2/2006 | Mathur et al. | 709/224 |

FOREIGN PATENT DOCUMENTS

JP    7087215    3/1995
WO    WO 01/75692 A2    10/2001

* cited by examiner

*Primary Examiner*—Rehana Perveen
*Assistant Examiner*—Brian Misiura
(74) *Attorney, Agent, or Firm*—Quarles & Brady Streich Lang LLP

(57) ABSTRACT

A device monitors a system's available resources and produces either a deferred notification or an instant notification based on a comparison with an established threshold. The threshold may be adjusted if current or anticipated system resource utilization changes. Changes to the threshold may result in deferred notifications being removed from a queue and an instant notification being transmitted to a reporting facility.

9 Claims, 5 Drawing Sheets

ADAPTIVE MESSAGE DELIVERY SYSTEM

BACKGROUND OF THE INVENTION

1. Field of the Invention

This invention is related in general to data communications systems. In particular, the invention consists of an adaptive system for transmitting messages depending on dynamic system resources and system requirements.

2. Description of the Prior Art

Complex systems such as digital data storage systems traditionally include system resources such as processors, communication buses, and data storage devices. Typical data storage devices include hard-disk drives, magneto-optical drives, and magnetic tape cartridges. These system resources are dynamically allocated to specific tasks as the system is utilized. If a system resource fails or is taken off-line for maintenance, the system resources available for allocation are decreased. To address the problem of failed system resources, a notification is typically sent to a central location. This notification is used to generate corrective action, i.e., repair or replacement of the defective part. These notifications may either be sent when a system resource becomes unavailable or may be scheduled for later transmission.

In U.S. Pat. No. 5,892,898, Fujii et al. disclose an event management system for identifying and logging event information. The event management system includes an application for reporting an event message in response to an occurrence of a particular event. It would be advantageous, however, to transmit an event message at a deferred period of time. In particular, it would be advantageous to defer transmission until a notification window is open.

In U.S. Pat. No. 5,809,491, Kayalioglu et al. disclose a system for generating an exception report for a particular problem based on call traffic. The system maintains a count of occurrences for the problem. If the count exceeds a threshold, the system generates an exception report. It would be advantageous to have a similar system directed to hardware resources. For example, it would be advantageous to maintain a count of the number of failed hardware devices, such as hard-disk drives. It would be advantageous if this count of failed hardware devices was utilized to determine if an error notification should be deferred or transmitted as soon as possible.

It would also be advantageous to have a system of tracking the historical usage of system resources and utilizing the historical information to predict future system resource requirements. This prediction could be used to aid in the decision of deferring or transmitting a notification. Additionally, it would be advantageous to track current system resources and evaluate whether deferred notifications should be changed to instant notifications based on the current or near future system needs.

SUMMARY OF THE INVENTION

The invention disclosed herein utilizes a system resource monitoring algorithm to track the number of specific types of unavailable system resources. If the number of unavailable system resources exceeds a pre-established threshold, a notification is immediately transmitted. Otherwise, the notification is stored for deferred transmission. A predictive algorithm may utilize historical system resource requirements to dynamically adjust the threshold. If the threshold is lowered below the level of available system resources, previously deferred notifications may be changed to immediate notifications.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED EMBODIMENTS

This invention is based on the idea of monitoring system resources and sending notifications when these system resources become unavailable. The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays ("FPGAs"), application-specific integrated circuits ("ASICs"), complex programmable logic devices ("CPLDs"), programmable logic arrays ("PLAs"), microprocessors, or other similar processing devices.

Figure 1:
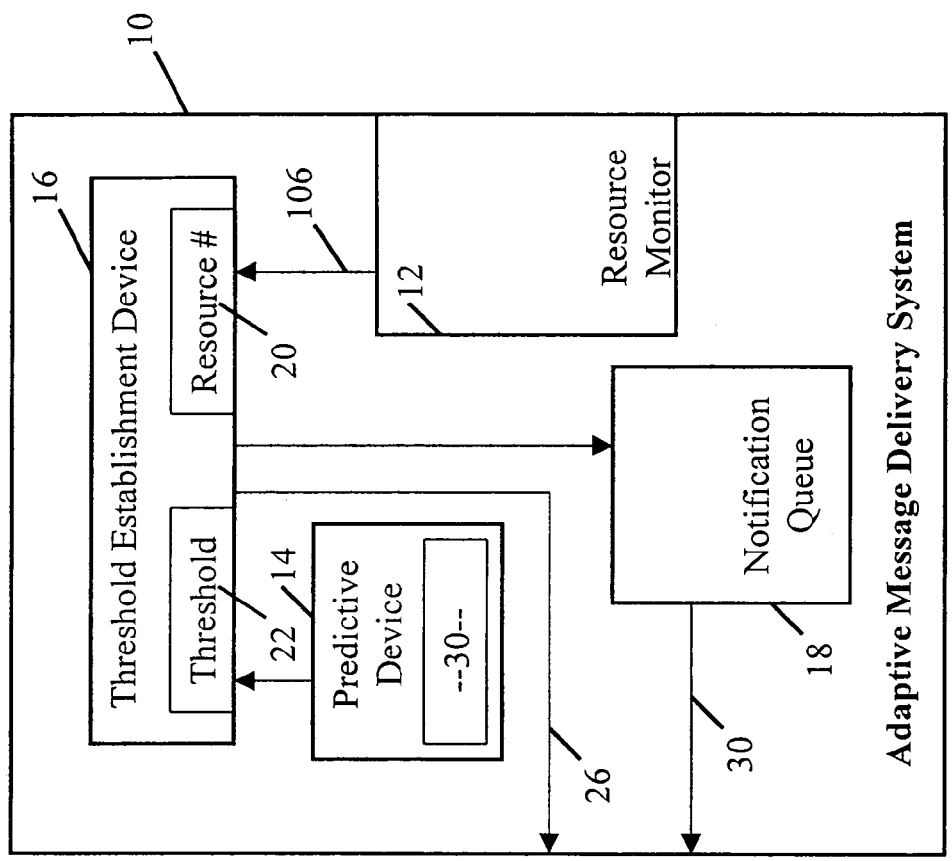
FIG. 1 is a block diagram illustrating an adaptive message delivery system including a system resource monitoring device, a predictive device, a threshold establishment device, and a notification queue.
Figure 2:
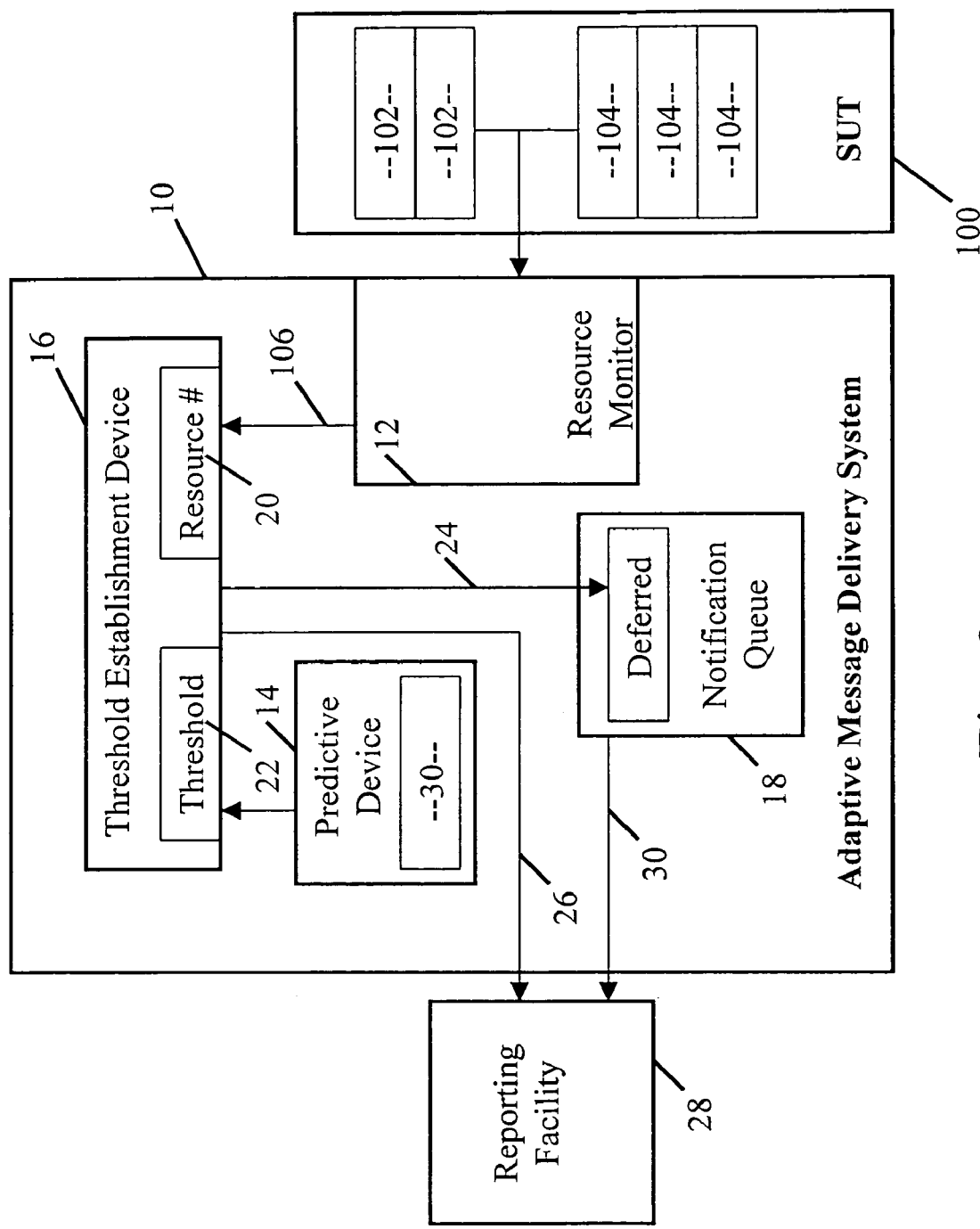
FIG. 2 is a block diagram illustrating the adaptive message delivery system of FIG. 1 and a system under test.

Referring to figures, wherein like parts are designated with the same reference numerals and symbols, FIG. 1 is a block diagram of an adaptive message delivery system 10 including a system resource monitoring device 12, a predictive device 14, a threshold establishment device 16, and a notification queue 18. In a simple embodiment of the invention, the system resource monitoring device keeps track of the number of specific types of available system resources. For example, turning to FIG. 2, the adaptive message delivery system 10 is shown with a system under test 100. In this embodiment of the invention, the system under test 100 is a data storage system including multiple processors 102 and data storage devices 104. The system resource monitoring device 12 determines when either a processor 102 or a data storage device 104 becomes unavailable for use by the data storage system 100. These devices may become unavailable as a result of mechanical failure, corrupted control software, interference with communication channels, improper power-on, or removal for preventive maintenance or replacement.

Notice 106 of a device unavailability is passed to the threshold establishment device 16 where a resource number 20 representative of available system resources is adjusted. This resource number 20 is compared against a threshold 22. If the resource number 20 is equal to or exceeds the threshold 22, a deferred notification 24 is placed in the notification queue 18 for deferred delivery. Deferred delivery would normally occur during a pre-determined period of time referred to as a notification window. If, however, the resource number 20 is less than the threshold 22, an instant notification 26 is transmitted as soon as possible. In this embodiment of the invention, the instant notification is transmitted to a centralized reporting facility 28.

The threshold 22 may be a fixed number or may be adjusted to account for variations in system resource usage. One method of adjusting the threshold 22 is to utilize a predictive device 14 to anticipate future system resource needs. This can be accomplished by maintaining a resource usage history 30 based on prior system resource utilization. This resource usage history may be maintained as a look-up-table or other data structure in a memory device, such as a random access memory ("RAM") or a non-volatile memory such as a disk file. If a pattern of system resource utilization is detected, the predictive device 14 may vary the threshold 22 in anticipation of heavy, normal, and light periods of system resource utilization. In this manner, a deferred notification 24 of a failure of a data storage device 104 may be placed in the notification queue 18 during periods of light resource utilization. A failure of an additionally data storage device 104 may result in an instant notification 26 notification being transmitted if the resource number 20 associated with data storage devices 104 is lower than the associated threshold 22. However, if the predictive device anticipates normal or heavy system resource utilization in the near future, the threshold 22 may be lowered, resulting in both the first failure and second failure producing instant notifications.

Another aspect of the invention is that changes to the threshold 22 by the predictive device 14 may result in a deferred notification 24 being removed from the notification queue 18 and being transmitted as an instant notification 30. For example, a deferred notification 24 may be placed in the notification queue 18 during a period when the threshold 22 for data storage devices is low. Subsequently, the predictive device 14 determines that a normal or high period of usage is approaching and adjusts the threshold 22 upward, indicating a need for a higher number of data storage devices 104. If the resource number 20 is lower than the threshold 22, the deferred notification 24 is removed from the notification queue 18 and transmitted to the centralized reporting facility.

The threshold 22 may be a fixed number or may be adjusted to account for variations in system resource usage. One method of adjusting the threshold 22 is to utilize a predictive device to anticipate future system resource needs. This can be accomplished by maintaining a resource usage history 30 based on prior system resource utilization. This resource usage history may be maintained as a look-up table or other data structure in a memory device, such as a random access memory ("RAM") or a non-volatile memory such as a disk-file. If a pattern of system resource utilization is detected, the predictive device 14 may vary the threshold 22 in anticipation of heavy, normal, and light periods of system resource utilization. In this manner, a deferred notification 24 of a failure of a data storage device 104 may be placed in the notification queue 18 during periods of light resource utilization. A failure of an additional data storage device 104 may result in an instant notification 26 notification being transmitted it the resource number 20 associated with data storage devices 104 is lower than the associated threshold 22. However, it the predictive device anticipates normal or heavy system resource utilization in the near future, the threshold 22 may be lowered, resulting in both the first failure and second failure producing instant notifications.

Figure 3:
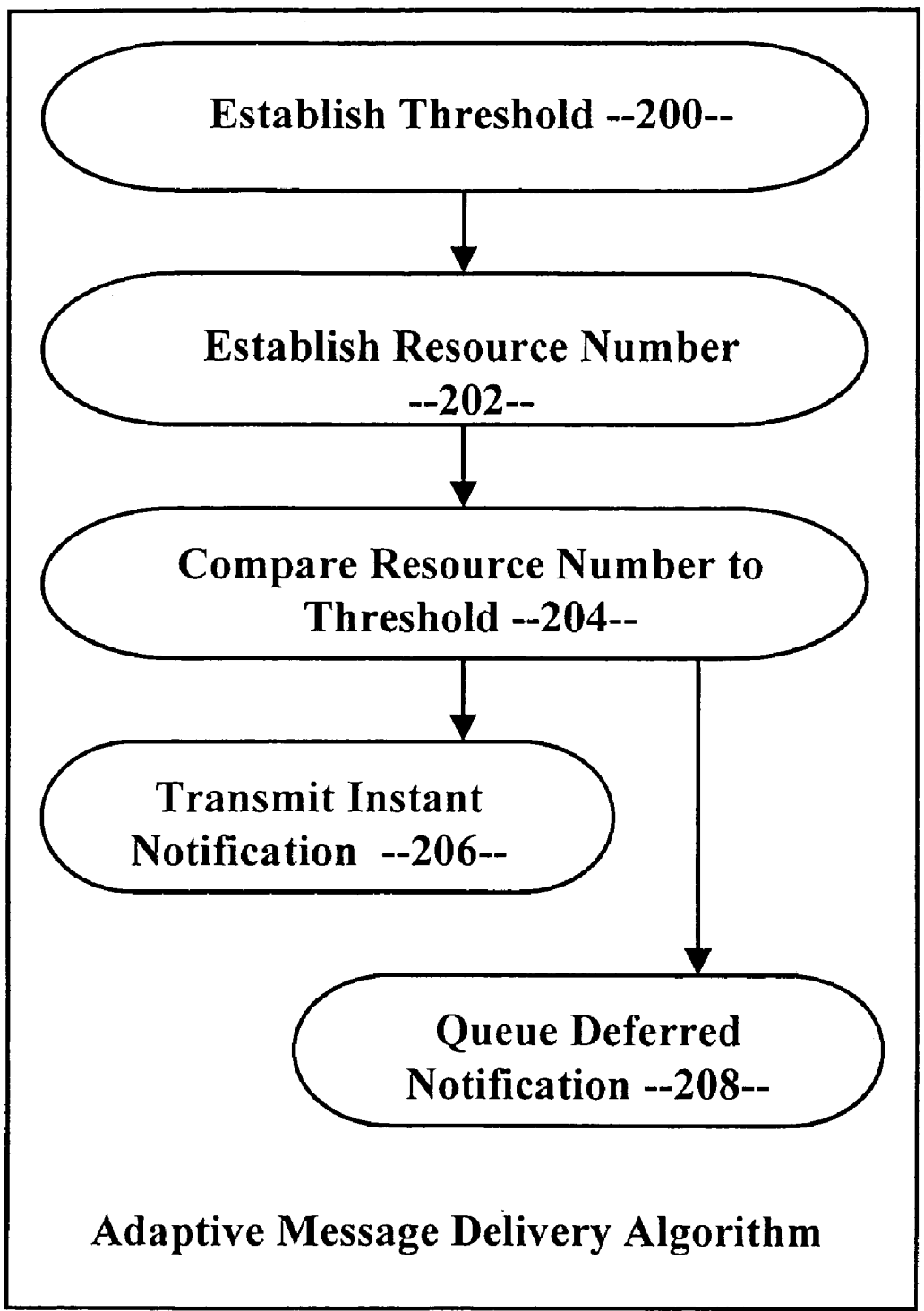
FIG. 3 is a flow chart illustrating the process of establishing and adapting a notification threshold.
Figure 4:
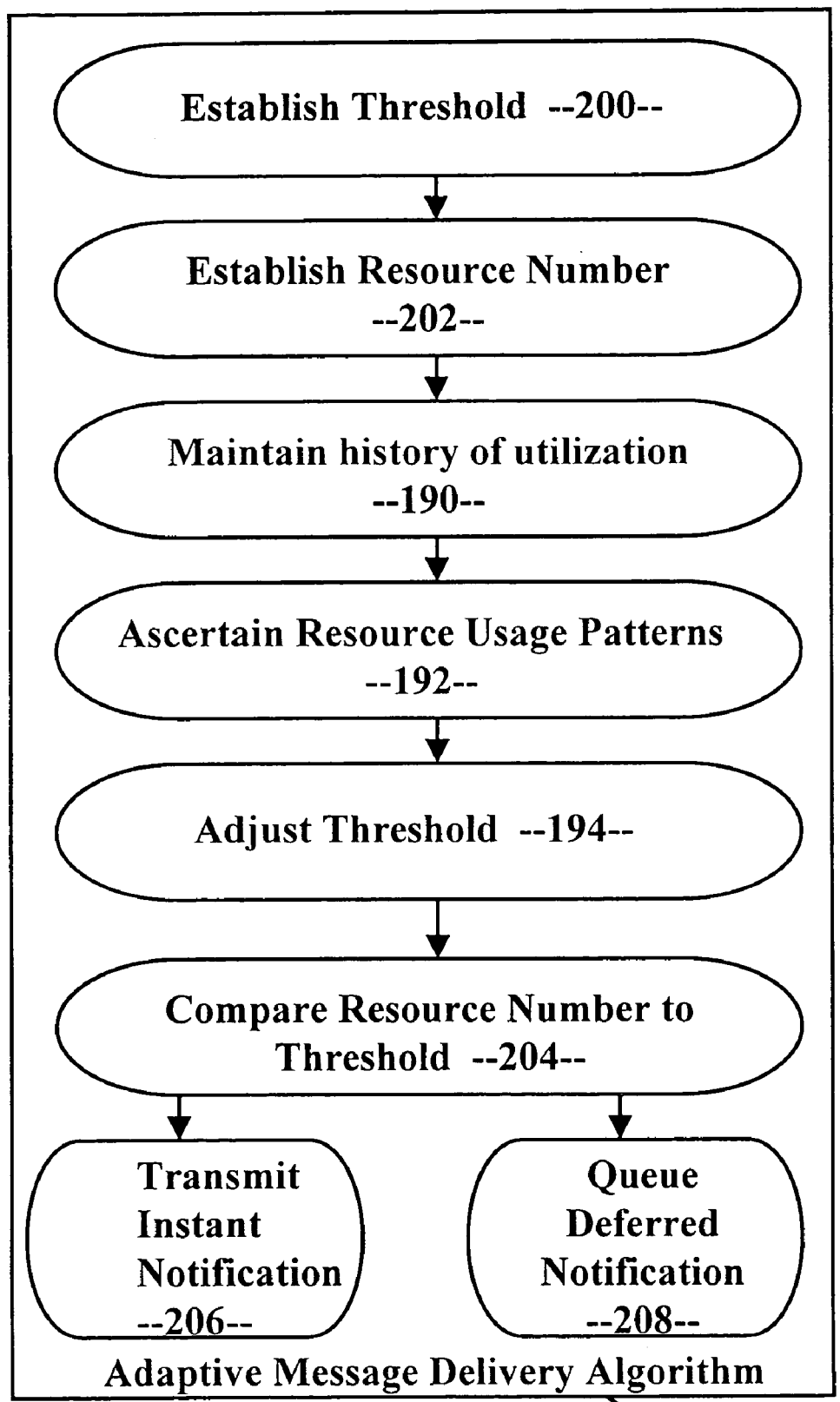
FIG. 4 illustrates the process of FIG. 3 and is expanded to include a predictive algorithm.
Figure 5:
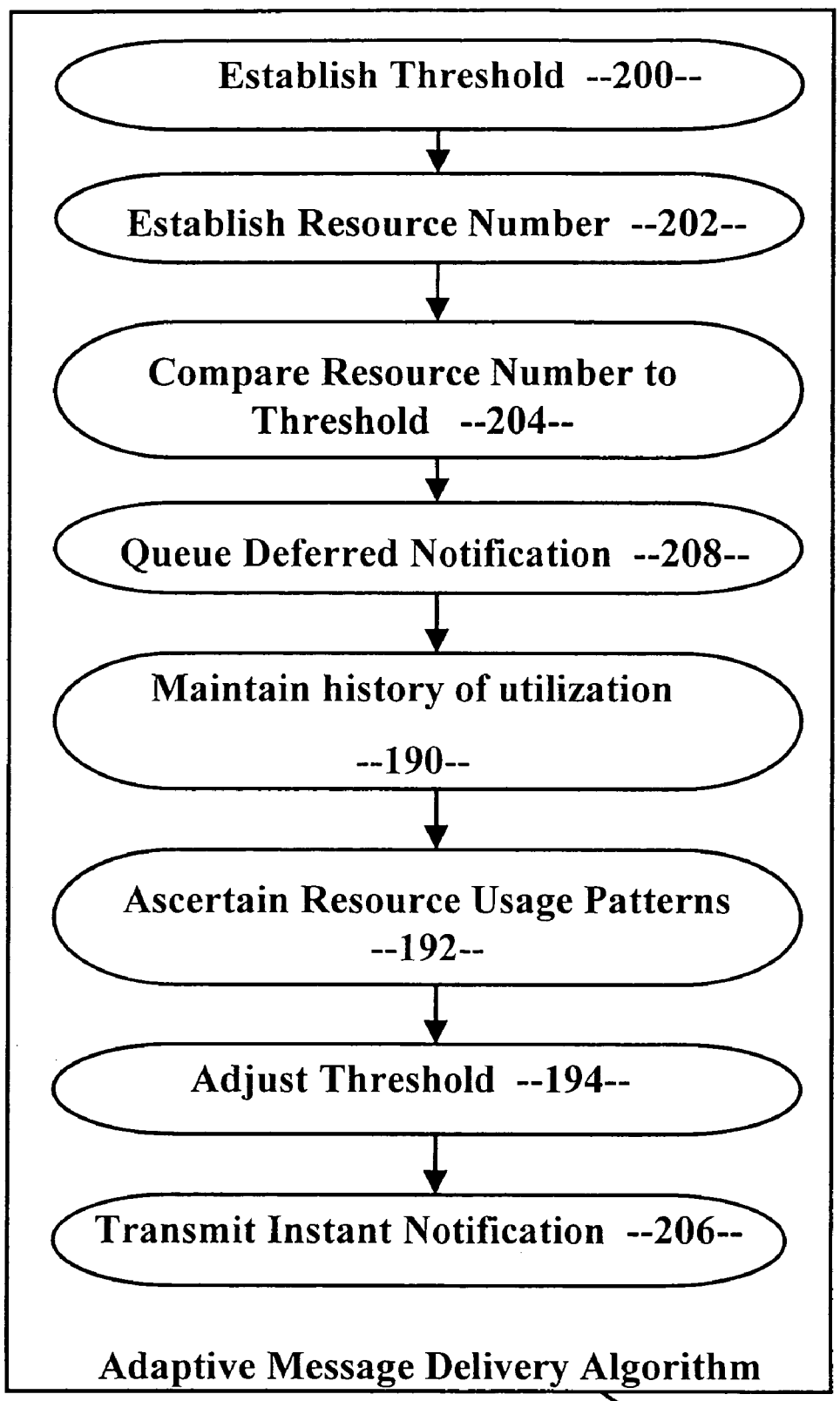
FIG. 5 is a flow chart illustrating the process of FIG. 4 with the added step of removing a deferred notification.

FIG. 4 illustrates the process of FIG. 3 expanded to include a predictive algorithm. In step 190, a resource usage history 30 is maintained in a memory device such as a random access memory or a non-volatile memory such as a disk file. In step 192, the predictive device 14 analyzes the resource usage history 30 to ascertain resource usage patterns. The predictive device 14 may include a hardware device 14a or a computing device 14b implementing a software construct (analysis software) 14c to analyze the resource usage history 30. Once resource usage patterns have been ascertained, the predictive device 14 adjusts the threshold 22 to accommodate anticipated system resource usage in step 194. FIG. 5 is a flow chart illustrating the process of FIG. 4 with the added step of removing a deferred notification 24 from the notification queue 18 and transmitting an instant notification 26 in step 206, in response to the threshold 22 being adjusted (step 194).

Those skilled in the art of making data communication systems may develop other embodiments of the present invention. For example, an adaptive message delivery system 10 may be used to monitor more than one system under test 100. Or, instant notifications 26 may be transmitted to more than one location. However, the terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:
1. An adaptive message-delivery system, comprising:
a system-resource monitoring device adapted to monitor a plurality of system resources of a first type in a system under test and generate a first resource number indicative of a quantity of said first type of system resources that is currently available;
a threshold-establishment device adapted to receive said first resource number and compare it with a first threshold number indicative of a minimum acceptable number of said plurality of system resources of a first type and, if the first resource number is less than the first threshold number, to transmit a first instant notification or, if the first resource number is equal to or greater than the first threshold number, to place a first deferred notification in a notification queue; and
a predictive device adapted to anticipate a future utilization of said plurality of system resources and to adjust said first threshold number based on said future utilization of said plurality of system resources, wherein the predictive device is adapted to maintain a history of utilization of said plurality of system resources of a first type, said future utilization based on said history of utilization, and the notification queue is adapted to remove the deferred notification from the notification queue and to transmit a second instant notification, it the first resource number is less than the first threshold number adjusted by the predictive device.

2. The adaptive message-delivery system of claim 1, wherein said threshold-establishment device 16 is adapted to transmit said first instant notification to a reporting facility.

3. A method of adaptively delivering messages, comprising the steps of:
   establishing a threshold number indicative of a minimum acceptable number of a plurality of system resources of a first type;
   establishing a resource number indicative of a quantity of the plurality of system resources of a first type that is currently available;
   comparing the threshold number to the resource number;
   if the resource number is less than the threshold number, transmitting a first instant notification;
   placing a deferred notification in a notification queue if the resource number is equal or greater than the threshold number;
   maintaining a historical utilization of the plurality of system resources of a first type;
   anticipating a future utilization of the plurality of system resources of a first type based on maintaining a history of utilization of the plurality of system resources of the first type;
   adjusting the threshold number based on anticipating a future utilization of the plurality of s stem resources of a first type to obtain an adjusted threshold number;
   removing the deferred notification from the notification queue; and
   transmitting a second instant notification if the resource number is less than the adjusted threshold number.

4. An article of manufacture including a data storage medium, said data storage medium including a set of machine-readable instructions that are executable by a processing device to implement an algorithm, said algorithm comprising the steps of:
   establishing a threshold number indicative of a minimum acceptable number of a plurality of system resources of a first type;
   establishing a resource number indicative of a quantity of the plurality of system resources of a first type that is currently available;
   comparing the threshold number to the resource number; and
   if the resource number is less than the threshold number, transmitting a first instant notification;
   placing a deferred notification in a notification queue if the resource number is equal or greater than the threshold number;
   maintaining a historical utilization of the plurality of system resources of a first type;
   anticipating a future utilization of the plurality of system resources of a first type based on maintaining a history of utilization of the plurality of system resources of the first type;
   adjusting the threshold number based on anticipating a future utilization of the plurality of system resources of a first type to obtain an adjusted threshold number;
   removing the deferred notification from the notification queue; and
   transmitting a second instant notification if the resource number is less than the adjusted threshold number.

5. The adaptive message delivery system of claim 1, wherein the predictive device includes a hardware device or a computing device implementing a software construct to analyze resource usage history.

6. The method of claim 3, wherein anticipating a future utilization of the plurality of system resources of a first type is performed using a hardware device or a computing device implementing a software construct to analyze resource usage history.

7. The method of claim 3, further including transmitting the first instant notification to a reporting facility.

8. The article of manufacture of claim 4, wherein the step of anticipating a future utilization of the plurality of system resources of a first type is performed using a hardware device or a computing device implementing a software construct to analyze resource usage history.

9. The article of manufacture of claim 4, further comprising the step of transmitting the first instant notification to a reporting facility.

* * * * *